Jan. 4, 19    ,458,437
Filed April 20, 1945    2 Sheets-Sheet 1
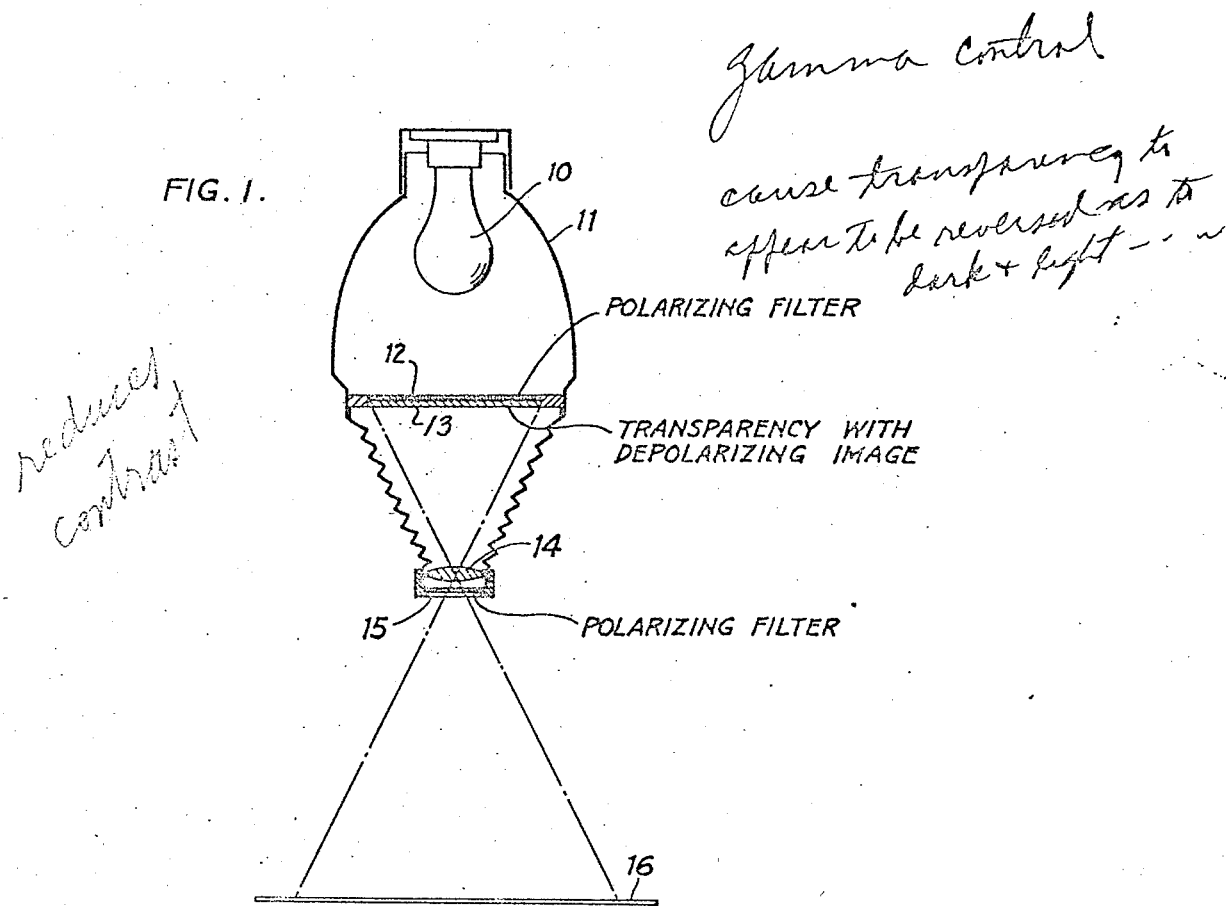
FIG. 1.
FIG. 2.
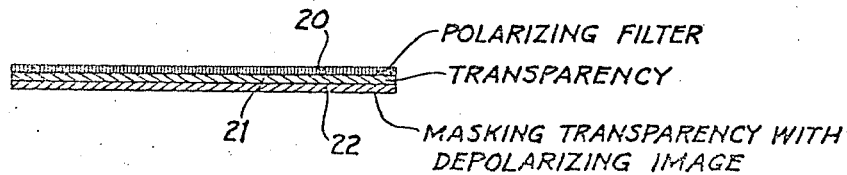
CEDRIC HAROLD SMITH
*INVENTOR*
BY
ATTY & AG'T Jan. 4, 1949.   C. H. SMITH   2,458,437
PHOTOGRAPHIC GAMMA CONTROL
Filed April 20, 1945   2 Sheets-Sheet 2

CEDRIC HAROLD SMITH
INVENTOR
BY
ATTY & AGT

Patented Jan. 4, 1949

2,458,437

UNITED STATES PATENT OFFICE 2,458,437

PHOTOGRAPHIC GAMMA CONTROL

Cedric Harold Smith, Wealdstone, England, assignor to Eastman Kodak Company, Rochester, N. Y., a corporation of New Jersey Application April 20, 1945, Serial No. 589,393

6 Claims. (Cl. 95—5)

This is a continuation-in-part of Serial No. 448,457 filed June 25, 1942, now abandoned, and its purpose is merely to include words of explanation obvious from but not appearing in the original.

This invention relates to a method of modifying the effective tones of transparencies which are either to be viewed directly or to be used for the preparation of photographic prints, for example, color separation negatives. That is, it relates to gamma control and has for its primary object the provision of a method of gamma control.

One object of my invention is to provide a method of causing a transparency to appear to be reversed as to dark and light by optical means so that when such optical means are removed the transparency appears to be not so reversed. According to my invention this is achieved by first making the transparency as an image in a compound which possesses a high depolarizing power and then placing this transparency between polarizing filters which are so oriented relative to each other that the light which is polarized by the first polarizer and which is not depolarized by a lighter tone of the image is stopped by the second polarizing layer at least sufficiently so that such tone appears less bright than an originally darker tone from which there is more depolarized light able to pass through the second polarizing layer.

Anothed object of my invention is to cause a transparency to appear to be of more or less uniform tone all over. According to my invention this is achieved by adjusting the above-mentioned polarizers so that the light which is polarized by the first polarizer and which is not depolarized by a lighter tone of the image is stopped by the second polarizer just sufficiently that such tone becomes of equal brightness to an originally darker tone from which there is more depolarized light able to pass through the second polarizer.

Thus, the present invention has the advantage over prior methods of controlling the gamma of photographic images, of varying the gamma all the way from a positive through zero to a negative. This unique phenomenon has a certain similarity to the effect of dark field illumination as compared with direct illumination in microscopy. Since something like dark field phenomena have been applied to photographic printing in prior proposals, their operation will be discussed briefly mainly to bring out the points of dissimilarity. To produce negative gamma by converting from direct to dark field illumination requires so-called side lighting, which means that the illumination varies from point to point of the object or image being illuminated and this variation is quite noticeable except when the area is very small indeed as under a microscope. Thus, in comparison with any system of dark field illumination, the present invention has as one of its objects and main advantages, the provision of uniform illumination over the whole of the image and also over the whole of the sensitive surface when a print is made therefrom. Also the dark field systems are very inefficient optically, requiring an enormous increase in exposure times when the dark field alternative is used.

Another object of the invention has to do only with color photography and is to provide a differential gamma control system so that when two images are in masking register, the gamma of one may be varied at will, without appreciably affecting the gamma of the other. At least the relative gamma of two images can be controlled even to the point of eliminating one of the images entirely (giving it zero gamma) or changing its gamma from positive to negative.

According to the invention the apparent gamma of a record containing a light-depolarizing image is varied by trans-illuminating the image uniformly with polarized light and orienting a uniform polarizing filter in the light from the image in accordance with the gamma desired. When a gamma is desired negative to that of the image viewed normally, the polarizing filters are crossed so that substantially the only light transmitted through the second filter is a portion of that which is depolarized when incident on this second filter. Attention is drawn to the fact that this invention actually relates to gamma control and is not concerned with glare control or any other front surface phenomena. It affects different areas of the original differently depending only on the tone. Glare control on the other hand, affects all tones the same and merely operates on front surface specular reflections and has nothing to do with transmitted light.

When performing my invention with photographic silver images these are converted into a whitish or pale colored compound, such as silver iodide, or other similarly highly light depolarizing compound. In general, materials which scatter light depolarize it, but materials are known which scatter without appreciable depolarization and other materials are known in which depolarization appears to be out of proportion to any scattering of the light. The degree of depolarizing of light scattered by dispersed isotropic particles is a function of the refractive index difference at the surface of the particles. Thus the depolarization is considerably greater with silver iodide (N greater than 2.4) in gelatin (N=1.54) than it is with silver chloride (N=2.07). Anisotropic materials are much more efficient at depolarizing light, and the effect is proportional to the degree of anisotropy; they can depolarize without scattering. Silver particles themselves, on the other hand, are much less effective depolarizers when transilluminated since each particle reflects or absorbs the incident light not transmitting it, and only the relatively small amount which is reflected is at all depolarized. Actually only a portion of the reflected light is depolarized since silver can reflect polarized light unchanged depending on the relation between the plane of polarization and the plane of reflection.

In principle the technique consists of the conversion of the silver of a transparency into a substance which highly depolarizes light, the transparency so modified being placed between polarizing sheets (filters) mutually rotatable with respect to one another. For example, a fixed and washed negative, whose densities lie preferably in the region represented by the toe and lower part of the characteristic curve, but which is nevertheless developed to a high gamma in a clean-working developer, is bleached in a bath of iodine and potassium iodide until white everywhere through to the support, cleared in sodium bisulphite solution, washed and dried. Alternatively, it may be bleached in a solution containing lead nitrate, potassium ferricyanide, and acetic acid, and washed until white. The mixture of lead ferrocyanide and silver ferrocyanide is anisotropic. It is then placed between polarizing sheets and inserted (say) in the stage of a powerful optical lantern or enlarger. In this, for preference, the negative is brightly illuminated by diffuse light. For making contact prints, polarizing sheet in thin celluloid form may be placed between the bleached negative and the printing paper or other copying medium. Another polarizing sheet, which can be rotated in its own plane, is then placed between the negative and the light, and rotated until the negative prints as though it were a positive.

The highly light depolarizing image (for example, of silver iodide) depolarizes some of the plane polarized light which leaves the sheet nearest the light source, so that some of it is able to pass through the second screen whatever the orientation of that screen. The proportion of the light which is depolarized depends on the amount of silver iodide or other light depolarizing compound at any point and is greatest in the highlights of the original picture where the said compound in the negative is in greatest amount. The portion not depolarized passes the second screen roughly in proportion to the square of the cosine of the angle through which it is displaced from the parallel position. The relation between the tones is therefore continuously variable by rotating one of the screens, and as they approach the fully crossed position the screen more remote from the light will extinguish so much of the polarized light passing through the more transparent parts of the negative that they appear less bright than the opaque parts, where extensive depolarization takes place. For this purpose a diffused light projection apparatus is superior to one utilizing a condenser and a light source of small area. In the case of projection printing, the screen more remote from the light may be placed in or on the objective, where it may be more readily accessible for rotation.

In the case of negatives carrying only a ghost image due to exposure near the lower limit of their sensitivity, the method can yield a direct positive image (on placing the bleached negative between crossed polarizing sheets before a bright source of diffused light), which contains more useful information than that available by any other technique of direct viewing. It is thus a means of utilizing the utmost speed of a given photographic negative material.

Negatives on supports which are not completely isotropic may have to be oriented in a certain fixed relation to the stationary polarizing sheet. With commercial materials this generally means that one edge of the negative must be parallel to the polarizing direction of the sheet and the orientation presents no difficulty.

An important application of my invention is to color printing. Dyes and pigments for subtractive color printing from color separation negatives are still deficient in many respects, so that prints of the highest quality can only be made by reducing the amount of color printed from one negative (e. g. the yellow printer), by an amount everywhere proportional to the color printed at the same points from another negative or negatives. This is usually done by making low gamma positive masks which are bound up in register with the negative being printed. The technique described above affords not only a very simple and convenient means of utilizing one of the actual negatives as a positive mask, thus avoiding the necessity of making a special positive mask, but has the added advantage that this apparent positive mask can be easily varied in its effective gamma until the desired gamma (or masking factor) to effect the required color correction has been found. Moreover, even when an actual positive image mask is made, my invention enables the effective gamma of this mask to be adjusted to give the correct color correction with little or no effect on the gamma of the negative with which it is bound up, by making such mask in a substance of high light depolarizing power such as silver iodide and making the negative in a substance of low depolarizing power such as silver or a dye.

In the examples below the case where a mask from the red-filter negative is required to modify the green-filter negative, and a mask from the green-filter negative is required to modify the blue-filter negative is considered. The principles employed may, however, be adapted to other arrangements.

*Example A*

Contact positives made in the usual way from the red-filter and green-filter negatives are bleached to silver iodide or the like and each bound up in register with the negatives that they are required to modify. In each case the pair is placed between polarizing sheets as outlined above. The effective gamma of the bleached positive is then altered conveniently by rotating one of the screens, while that of the unbleached negative in register with it is little affected. This technique avoids the difficulty often encountered in making a mask to an exact pre-determined gamma.

Example B

The separation negatives themselves may be used as positive masks by bleaching them and placing them between polarizing sheets which are oriented so as effectively to reverse them to positives. In the following steps the green-filter negative is exposed through the support, so that it can be bound in register with each of the others in turn. Where the tri-color separation negatives are on very thin supports this complication may be unnecessary.

(1) The red-filter negative (silver image) is printed without polarizing sheets. This yields the cyan print or relief.

(2) The red-filter negative is bleached to silver iodide, and bound up in register with the green-filter negative (silver image). The print is made with the use of polarizing sheets so oriented to each other as to reverse the bleached red-filter negative so that it prints as a positive mask of appropriate gamma. This yields the magenta print or relief.

(3) The green-filter negative is bleached to silver iodide and bound up in register with the blue-filter negative (silver image). The print is made with the aid of polarizing sheets so oriented to each other as to reverse the bleached green-filter negative so that it prints as a positive mask of appropriate gamma. This yields the yellow print or relief.

If all the partial minus-color prints or reliefs required are made at one time in the above order, i. e. all the cyan, all the magenta, all the yellow, no bleached negatives will need redevelopment. Where the negatives are required for use again, it is necessary to redevelop the green-filter negative to silver so that it is not effectively reversed when used again in step 2 (which would in this case best follow the making of all the new yellow prints or reliefs by step 3). The red-filter negative can be employed in its bleached condition and printed with the aid of polarizing sheets in step 1, because this can otherwise be advantageous since it softens it so as to match the (optically) masked negatives printed in steps 2 and 3, yielding equal gamma in the scale of greys. Alternatively, it can be temporarily strengthened for re-use by dyeing the silver compound.

Example C

By first bleaching all three separation negatives as a routine, redevelopment complications for reprinting are avoided. The appropriate negatives are effectively reversed when required by being included between polarizing sheets, while the negatives bound up with them which are required to remain as negatives are left outside the polarizing system. This can be very conveniently achieved by sandwiching a thin Celluloid polarizing sheet between the two bleached negatives when they are bound up in register, and then putting the second polarizer either on the outside of one negative or on the outside of the other negative. An alternative system is to use three polarizing sheets, so that the order of the layers is: polarizing sheet, negative, thin polarizing sheet, negative, polarizing sheet; and by making the outermost polarizing sheets independently rotatable the gamma of each negative of the sandwich can be independently varied, and made either positive or negative. Again the green-filter negative is exposed through the support.

(1) The bleached red-filter negative alone is printed between one pair of polarizing screens and the screens are adjusted to give a positive print of suitable gamma. This gives the cyan print or relief which has of course not been masked.

(2) The bleached red-filter negative is bound up in register with the bleached green-filter negative with a thin polarizing sheet between them. The red-filter negative is reversed so that it prints as a positive of suitable gamma by adjusting a rotatable polarizing sheet which is on the outside of such red-filter negative, while the green-filter negative is left as a negative and given an effective appropriate gamma by adjusting a rotatable polarizing sheet which is on the outside of such green-filter negative. This gives the magenta print or relief. This same combination of negatives can also be used for step 1, by neutralizing the green-filter negative completely, (i. e. rendering it effectively of uniform tone all over), with the aid of the polarizing sheet. The same set-up may therefore, if desired, be left in position while the cyan and magenta prints are made.

(3) The bleached green-filter negative (or a duplicate) is bound up in register with the bleached blue-filter negative, with a thin polarizing sheet between them. The green-filter negative is reversed to appear as a positive of appropriate gamma by adjusting a rotatable polarizing sheet which is on the outside of such green-filter negative, while the blue-filter negative is left as a negative and given an effective appropriate gamma by adjusting a rotatable polarizing sheet which is on the outside of such blue-filter negative. This gives the yellow print or relief.

To obtain the best reversal effects in Examples B and C, a projection apparatus in which the registered negatives are illuminated by very diffuse light (as from an illuminated opal glass plate) should be employed. When making the negatives for use in such reversal they should preferably be exposed such that the densities lie on the toe and lower part of the characteristic H and D curve of the emulsion, which in practice means that the plates or films are used on the basis of a high speed rating for their grade.

The invention is illustrated in the accompanying drawing in which:

Fig. 1 illustrates projection printing according to the invention;

Fig. 2 shows an alternative detail for Fig. 1 useful for masking.

Figure 3:
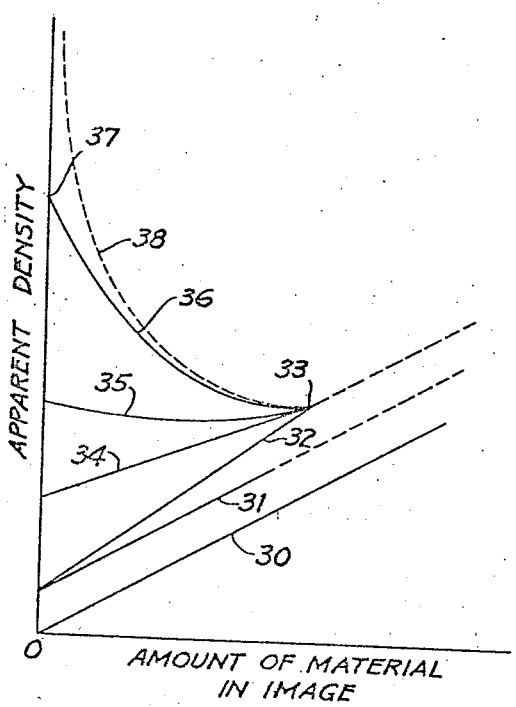
Figs. 3 and 4 are graphical illustrations of the theory of the invention.

In Fig. 1 light from a lamp 10 in a lamphouse 11 passes through a uniform polarizing filter 12 to illuminate a negative or other transparency 13 in which the image is light depolarizing. By means of a lens 14 this image is focused on a light sensitive material 16. Immediately in front of the lens 14 is a uniform polarizing filter 15 which may be rotated to have any desired orientation relative to the polarizing filter 12. If the filter 15 is set with its vibration axis parallel to that of the filter 12 the negative 13 will have its maximum negative gamma. As the filter 15 is rotated this contrast is reduced due to the depolarizing properties of the image in the negative 13. The denser portions of the image 13 depolarize more greatly than the less dense portions. The intensity of this depolarized light is reduced by the filter 15 uniformly, whatever the orientation of the filter 15.

When the filter 15 is rotated to bring its vibration axis exactly at right angles to that of filter 12, the polarized light carrying the negative image is cut out entirely whereas the depolarized light carrying a positive image still passes through the filter 15. Somewhere between the two extremes in the orientation of the filter 15 is a point at which the gamma of the negative image in polarized light is reduced approximately to match the gamma of the positive image in depolarized light. Theoretically, the image should disappear entirely at this point, but actually a very low gamma image is still detectable due to the non-linearity of the characteristic curve representing the image.

Fig. 2 illustrates an element to replace elements 12 and 13 of Fig. 1. In Fig. 2 the polarization filter 20 corresponds to 12 and a masking transparency 22, for example, a color separation positive corresponds to the negative 13. Between these two layers is a transparency 21, for example, a color separation negative whose image preferably does not depolarize light. Actually the only essential requirement in this embodiment is that the transparencies 21 and 22 have substantially different degrees of light depolarizing power. With this arrangement, rotation of the polarizing filter 15 varies the apparent gamma of the mask 22 from a positive through zero gamma to a negative. At the same time the gamma of the transparency 21 is not affected, the only change being an increasing overall neutral density.

The whole effect can be considered, for example, in terms of a negative 21 in combination with a masking transparency 22 made up of two parts. One of these bears a constant gamma ratio to the transparency 21, both of them being in series with a variable neutral density. The other part of the transparency 21 may be considered of the opposite gamma which remains constant as the density is varied, and hence, becomes more and more effective relative to the gamma of the transparency 21, as the density is increased, namely, as the polarizing filter 15 is rotated to the crossed position.

It will be noted that the distribution of light over the transparency 13 and also the distribution of light over the sensitive material 16 in Fig. 1, is not affected in any way by the present invention. That is, there are no holes cut in the polarizing filter 12 nor in the polarizing filter 15. This point is mentioned because it is responsible for the practical advantage which the present invention has over systems which depend on dark field illumination, i. e., illumination from the side.

Thus, the present invention involves gamma control by means of differentiation from one form of illumination to another or more exactly from one form of printing light to another. When the polarizing filters have their vibration axes parallel, the gamma of the transparency is approximately the same as (slightly higher than) when no polarizing filters are present. For clarity let us assume that the transparency is a negative. The actual gamma of this negative will depend on whether the illumination is specular or diffuse; this is well known. This has nothing to do with "specular" reflections from an original. True, such reflections are obtained when solid shiny objects are "specularly" illuminated but there are no specular reflections from a negative whether it is specularly illuminated or diffusely illuminated. The two meanings of the term specular should not be confused. Actually, as far as the theory of the present invention is concerned, it does not matter whether the illumination is specular or diffuse to begin with although I prefer to use diffuse illumination. For example, an ordinary negative of high scattering factor may have a diffuse density range of 1.0 when used in a diffusing printer, whereas the same negative may have an effective density range of 1.7 or even higher in a specular printer. This is just as true for silver images as for highly depolarizing images discussed below. The present invention can start with either of these conditions and vary the gamma so that the density range becomes less and less, eventually becoming zero and reversing so that the image appears as a positive rather than a negative. In this general connection, the terms "specular" and "diffuse" are used in their correct meanings and it should be understood that dark field illumination is quite different from either of these. Changing from specular illumination to diffuse illumination can never reduce gamma to zero. On the other hand, the present invention depending on the depolarizing properties of the image provides a method of reducing gamma to zero and even reversing its sign.

Fig. 3 is intended to illustrate how the gamma of an image changes from positive to negative or vice versa as the second polarizing filter is rotated. The apparent density from point to point of the image is plotted against the amount of material in the image. In the absence of both polarizing filters such as 12 and 15 in Fig. 1 the transparency has an apparent density as shown by the line 30. At any point of the image where there is no image forming material present the apparent density is zero and hence the line 30 passes through the origin O. When the first polarizing filter 12 is inserted ahead of the transparency, the apparent density at every point is raised by about .3 since this is the effective density of the polarizing filter and the resulting curve is that shown as 31. When the second polarizing filter 15 is inserted in the printing beam with its vibration axis parallel to that of the first filter 12 there is no increase in density at any point of the image which has zero material because the light already polarized by the first filter 12 is freely passed by the second filter 15. Hence the curve 32 coincides with the curve 31 at zero abscissa. In practice of course the second filter would actually have some density even when parallel to the first but for clarity this effect is omitted from the drawings since it does not affect the present invention in any way.

However due to the depolarization of the light by the transparency, the apparent density increases as the amount of depolarization increases. Hence the curve 32 rises from the curve 31 up to the point 33 which corresponds to that amount of image material which is just sufficient to depolarize completely the light reaching it. At this point the light is completely depolarized and since the second filter 15 has an apparent density of about .3 with respect to this light, the point 33 is about .3 higher than the corresponding point on the curve 31. At any point of the image at which the density is greater than that necessary to depolarize the light, the present invention becomes ineffective and the curve as shown by broken lines remains at the same apparent gamma whether the polarizing filters are present or not. Incidentally it will be noted that the curve 32 has a greater gamma than the curve 31.

As the second polarizing filter 15 is rotated, the apparent density of a zero density image point increases, but the apparent density at the point 33 remains unchanged because the light is completely depolarized by the image anyway and rotation of the polarizing filter does not change its effect in any way. Therefore as the filter 15 is rotated, the curve shifts continuously as indicated by curves 34, 35, and 36. The point 37 on the density axis is the maximum density reached by crossed filters. If theoretically perfect, this maximum density would go to infinity and the resultant curve would be that shown by broken line 38. The curve 34 has less gamma than the curve 32. The curve 35 has zero over-all gamma and variations from this are negligibly small. The portions of the image out beyond the point 33 would still have normal gamma, but the useful portions of the image as represented by the curve 35 have effectively zero gamma. As the polarizing filter is rotated further, the gamma becomes negative to that which it originally had and eventually results in the value indicated by the curve 36.

Figure 4:
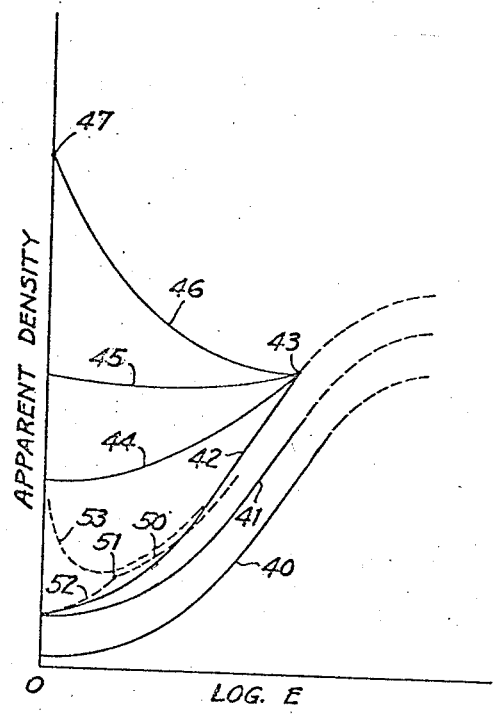

The same phenomenon is plotted in Fig. 4 with respect to log exposure since this is the more usual way to consider photographic densities. The numbers 40 to 47 correspond to those in Fig. 3, nos. 30 to 37. The height at which the point 43 comes on the H and D curve depends on the material constituting the image. In ordinary silver images this point is quite low down near the toe of the characteristic curve. The operation of the invention is restricted to log exposure values to the left of the point 43, but the same general form of curves apply for all materials. One thing brought out by Fig. 4 which is not apparent from Fig. 3 is the fact that characteristic curves representing photographic densities are always curved due to the well known toe portion and hence there is no additional detriment involved in the fact that the most negative gamma represented by the line 46 is curved.

An ordinary silver image does not have any appreciable change in depolarization effects beyond the toe of the characteristic curve as indicated by the broken curve 50. In the very thin regions of the image below the point 51 however, there is some effect as represented by the curves 52 and 53 which are the extremes produced by rotating the analyzing filter. The fact that the point 51 is far down on the characteristic curve compared to the point 43, has both advantages and disadvantages. It means, in the first place that the effect of the present invention with ordinary silver images is of little practical value because it is restricted to very thin negatives for example. On the other hand this is the very factor which permits operation of the differential gamma control discussed above in the color correction embodiments of the invention. The original negative may be a dye image for which the gamma is quite independent of the polarization of the transmitted light or it may be a silver image in which the gamma changes, if any, are restricted to the thinnest portions of the negative and are negligible. At the same time the mask is made of a material which is highly depolarizing and in which the depolarization is complete only at fairly high densities on the characteristic curve such as at the point 43. For log E values between the point 51 and the point 43, only the gamma of the mask changes as the polarizing filter is rotated.

The points 43 and 51 are both points of maximum effective depolarization. If the polarization is complete as in the case of the point 43, the height of this point above the curve 41 at the same log E value, is about .3, but if the maximum depolarization is less than this, the curve remains closer to the curve 41 throughout. As shown by curve 53 the curve shifts parallel to itself for all points to the right of the point 51. For clarity no actual density values have been indicated on the drawings, but the curves shown correspond effectively to actual measurements which have been made. The specific form of the curve depends on the materials used, but the results are always more or less in the form shown in Fig. 4.

Hurter and Driffield employed the term gamma to relate specifically to the slope or tone gradient of the straight line portion of the characteristic curve such as plotted in Fig. 4. Obviously, the present invention is concerned with the change in the tone gradient on the toe portion of the curve as well but since gamma is the accepted term, since the present invention does vary the gamma and since the other tone gradients such as on the toe of the curve are varied in exactly the same way as the gamma is varied, the change has been referred to throughout this specification and claims as gamma control. The very exactness of the established definition for the term gamma automatically avoids any ambiguity.

I claim:

1. The method of controlling gamma in an image which comprises forming the image in silver iodide in a transparent sheet, transilluminating the image uniformly with polarized light and orienting a polarizing filter in the light from the image in accordance with the gamma desired.

2. A method of producing negative gamma in an image which comprises forming the image in silver iodide in a transparent sheet, illuminating the image uniformly with polarized light and orienting a polarizing filter in the light from the image approximately at right angles to the polarization of the illuminating light.

3. The method of controlling the masking factor in making processes of photographic printing, which comprises placing in contact in masking register two records of the same original with substantially different light depolarizing power, illuminating the records with polarized light and orienting a polarizing filter in the light from the records in accordance with the masking factor desired.

4. The method of controlling the masking factor between two records of the same original while making a photographic print therefrom, which comprises forming the image in one of the records in translucent depolarizing pigment in a transparent sheet, the other record having a substantially non-depolarizing image, placing the two records in contact in masking register and in printing relation with one another, illuminating the records with polarized light and orienting a polarizing filter in the light from both of the records in accordance with the masking factor desired.

5. The method according to claim 3 in which the two records are different color separation records of the same original for the correction of color rendition.

6. The method according to claim 4 in which the two records are different color separation records of the same original for the correction of color rendition.

CEDRIC HAROLD SMITH.

(References on following page)

REFERENCES CITED

The following references are of record in the file of this patent:

UNITED STATES PATENTS

| Number | Name | Date |
|---|---|---|
| 1,676,580 | Sheppard | July 10, 1928 |
| 2,018,963 | Land | Oct. 29, 1935 |
| 2,146,962 | Land | Feb. 14, 1939 |
| 2,186,619 | Sauer | Jan. 9, 1940 |
| 2,203,652 | Ehrenfried | June 4, 1940 |
| 2,219,116 | Sauer | Oct. 22, 1940 |
| 2,263,684 | Ryan | Nov. 25, 1941 |
| 2,268,791 | Yule | Jan. 6, 1942 |
| 2,289,738 | Seymour | July 14, 1942 |
| 2,291,347 | Ryan | July 28, 1942 |
| 2,298,059 | Land | Oct. 6, 1942 |
| 2,304,988 | Yule | Dec. 15, 1942 |
| 2,316,643 | Yule | Apr. 13, 1943 |
| 2,316,644 | Yule | Apr. 13, 1943 |
| 2,360,225 | Hanson, Jr. et al. | Oct. 10, 1944 |

FOREIGN PATENTS

| Number | Country | Date |
|---|---|---|
| 839,171 | France | Mar. 28, 1939 |
| 839,172 | France | Mar. 28, 1939 |
| 839,173 | France | Mar. 28, 1939 |

OTHER REFERENCES

Tuttle: "Illumination in Printing," Journal of the Society of Motion Pictures Engineers, XIX, No. 1, July 1932, pages 842–864, page 851 cited.

Trivelli: "The Relation Between Contrast and Number of Grains in Photographic Emulsions," E. K. abridged publication, No. 678, vol. XX, 1938, pages 187–189 cited.

Clerc: "Photography, Theory and Practice," Sir Isaac Pitman & Sons, Ltd., 1930, page 452 cited.

Certificate of Correction

Patent No. 2,458,437. January 4, 1949.

CEDRIC HAROLD SMITH

It is hereby certified that error appears in the printed specification of the above numbered patent requiring correction as follows:

Column 10, line 44, claim 3, for the word "making" read *masking*; and that the said Letters Patent should be read with this correction therein that the same may conform to the record of the case in the Patent Office.

Signed and sealed this 17th day of May, A. D. 1949.

[SEAL]

THOMAS F. MURPHY,
*Assistant Commissioner of Patents.*